United States Patent
Xue et al.

(10) Patent No.: US 7,428,241 B1
(45) Date of Patent: Sep. 23, 2008

(54) ENERGY/BANDWIDTH EFFICIENT MEDIUM ACCESS CONTROL PROTOCOL FOR WIRELESS PACKET NETWORKS

(75) Inventors: Qi Xue, San Diego, CA (US); Weibo Gong, Amherst, MA (US); Aura Ganz, Amherst, MA (US)

(73) Assignee: University of Massachusetts, Amherst, MA (US)

( * ) Notice: Subject to any disclaimer, the term of this patent is extended or adjusted under 35 U.S.C. 154(b) by 512 days.

(21) Appl. No.: 11/109,492

(22) Filed: Apr. 19, 2005

Related U.S. Application Data (60) Provisional application No. 60/563,753, filed on Apr. 20, 2004.

(51) Int. Cl.
*H04L 12/413* (2006.01)
(52) U.S. Cl. .................. 370/448; 370/338; 370/468
(58) Field of Classification Search ............. 370/445, 370/447, 448, 395.4
See application file for complete search history.

(56) References Cited

U.S. PATENT DOCUMENTS

| | | | | |
|---|---|---|---|---|
| 5,991,308 A | * | 11/1999 | Fuhrmann et al. | 370/395.53 |
| 6,907,044 B1 | * | 6/2005 | Yonge et al. | 370/445 |
| 2002/0026523 A1 | * | 2/2002 | Mallory et al. | 709/236 |
| 2003/0181204 A1 | * | 9/2003 | Benveniste | 455/422.1 |

* cited by examiner

*Primary Examiner*—Ricky Ngo
*Assistant Examiner*—Ben H Liu
(74) *Attorney, Agent, or Firm*—Mirick, O'Connell, DeMallie & Lougee, LLP; Roger P. Zimmerman (57) ABSTRACT

An improved medium access protocol is divided into two tasks: collision avoidance and contention resolution. The purpose of the collision avoidance is to avoid occasional collisions due to the synchronization of channel access among different stations. The purpose of contention resolution is to control the overall sending rate of competing stations when the shared channel is operating at or near its capacity limits, such that excessive collisions can be avoided. Contention resolution methods in accordance with the present invention include a graceful rate control mechanism.

17 Claims, 5 Drawing Sheets

Figure 1: CSMA/CA2 vs CSMA/CA

FIG. 1A
(PRIOR ART)

Figure 1B: CSMA/CA2 vs. CSMA/CA (RTS/CTS mode)

Figure 2 : Flowchart for CSMA/CA2 rate update

ENERGY/BANDWIDTH EFFICIENT MEDIUM ACCESS CONTROL PROTOCOL FOR WIRELESS PACKET NETWORKS

CROSS-REFERENCE TO RELATED APPLICATIONS

The present application for United States patent is related to and claims priority from U.S. provisional patent application Ser. No. 60/563,753 filed Apr. 20, 2004, and entitled "Energy/Bandwidth Efficient Medium Access Control Protocol For Wireless Packet Networks."

FIELD OF THE INVENTION

The present invention relates generally to wireless networks, and, more particularly, to improved medium access control (MAC) protocols suitable for communications between and among devices and nodes in wireless packet networks.

BACKGROUND OF THE INVENTION

In recent years, wireless Local Area Networks (LANs) have become a significant technology in enterprise networks, public networks and home networks. Their high data rates and convenience of use enable the deployment of increasingly powerful (and bandwidth-hungry) mobile computing and communications devices. As a result, the use of wireless LANs, and the proliferation of devices adapted for operation in such networks, continues to accelerate.

At present, there are various methods and protocols for enabling communications between devices participating in a network, offering various levels of reliability, robustness and effectiveness. Similarly, a number of algorithms and methods have been developed to extend various network services to these network devices. These protocols typically work within the structure defined by the Open Systems Interconnection (OSI) reference model promulgated in 1984 by the International Organization for Standardization (ISO).

Figure 1:
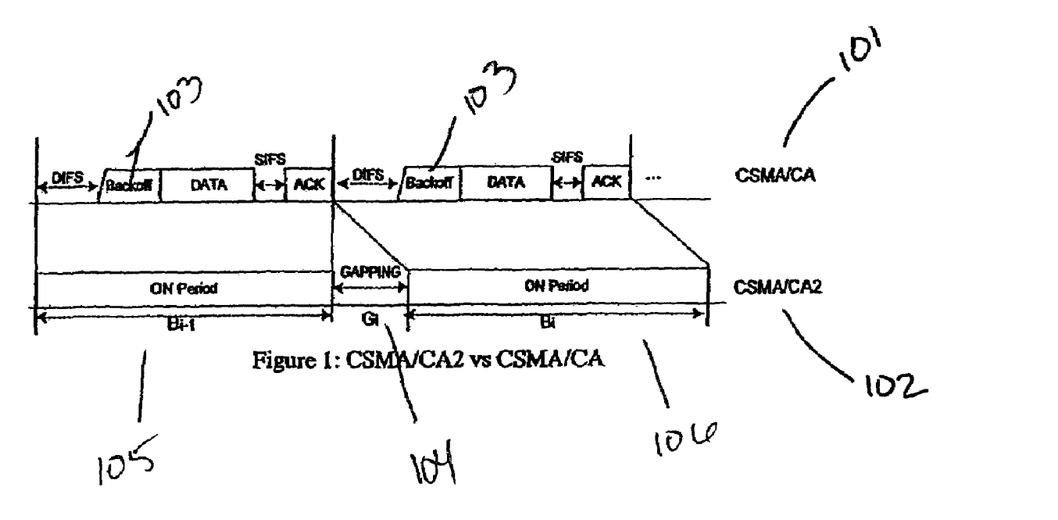
FIG. 1 is a diagram schematically depicting packet transmissions in conventional CSMA/CA, contrasted with packet transmissions in accordance with exemplary methods of the present invention, referred to herein as CSMA/CA2.
Figure 1A:
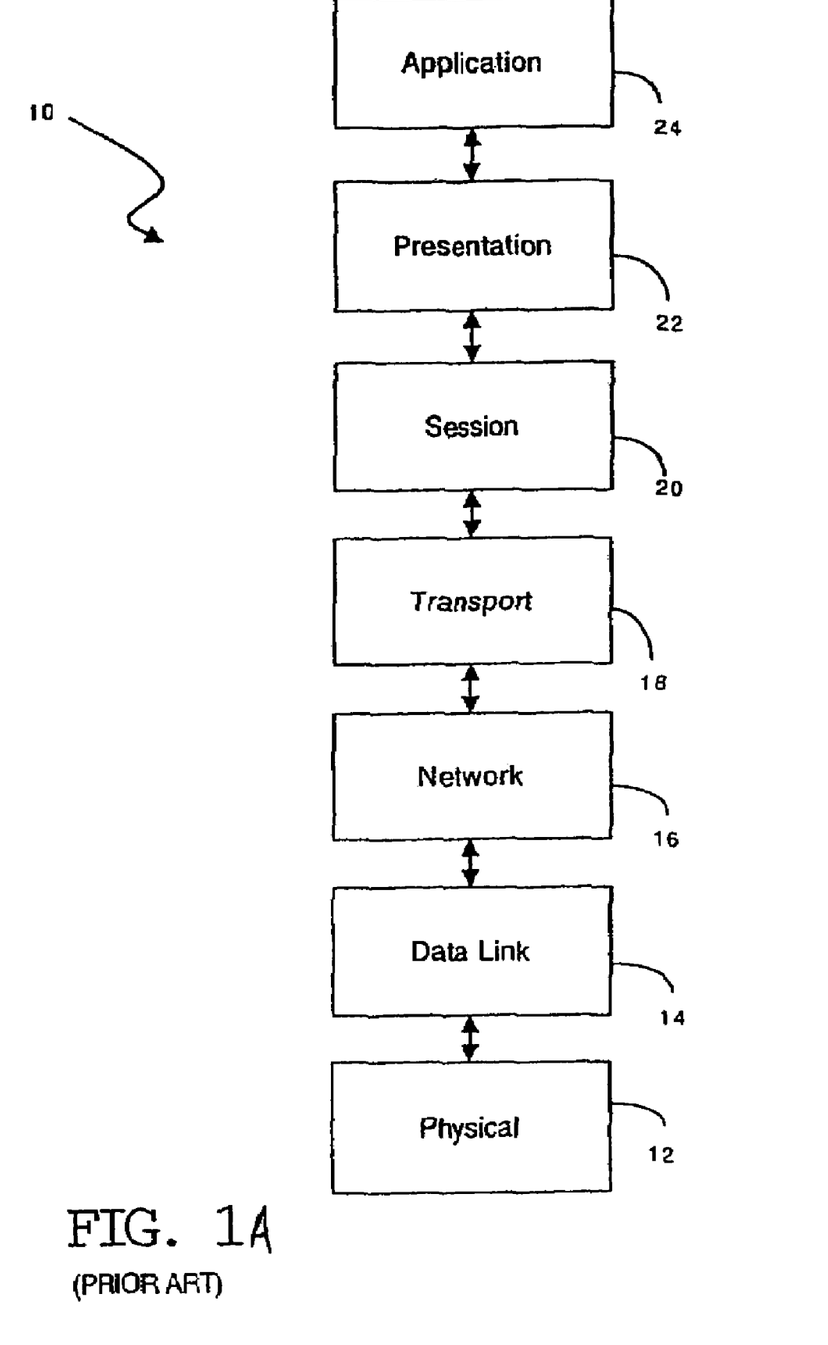
FIG. 1A is a block diagram illustrating the layers of the (prior art) Open Systems Interconnection (OSI) Reference Model.

As depicted schematically in the block diagram of FIG. 1A, the OSI reference model includes seven layers of network services including the Application layer 24 (the "highest" layer), the Presentation layer 22 below the Application layer, then the Session layer 20, the Transport layer 18, the Network layer 16, the Data Link layer 14, and finally the Physical layer 12 (the "lowest" layer).

Within the reference model, the Data Link layer offers various services to the Network layer, principally, transferring data from the Network layer of a source device to the Network layer on the destination or target device. The typical method is for the Data Link layer to break up the bit stream into discrete blocks of bits, compute a checksum for each block, and transmit the block along with the checksum to the target device in the form of a packet. When a packet arrives at the target device, the checksum is recomputed for the received block. If the newly computed checksum is different from the checksum provided by the source device, the Data Link layer identifies that an error has occurred and an error-recovery process is invoked.

At the Medium Access Control (MAC) sublayer of the Data Link layer, protocols are used to solve the issue of which network device gets to use the broadcast channel when there is competition for it. The MAC layer is particularly significant in LANs, in which the number of network devices competing for the communications channel may be very large.

Various examples of MAC protocols are set forth in U.S. Pat. Nos. 6,597,683; 6,621,872; 6,532,225; 6,546,001; 5,371,734; and 6,590,890.

One commonly used MAC technique is Carrier Sense Multiple Access (CSMA), in which a transmitting device first listens to the communications channel (carrier sensing) to determine if another device is transmitting at that moment.

Various versions of conventional CSMA are in use. In one, known as 1-persistent CSMA, a device that wishes to transmit executes carrier sensing and if the channel is busy, the device waits until the channel becomes idle. When the device detects an idle channel, it transmits its packet. Collisions can still occur, since a channel may be idle at the exact moment of carrier sensing, yet devices may be about to transmit their packets at about the same time.

In another CSMA version, nonpersistent CSMA, if carrier sensing indicates that the channel is in use, the device will wait for a random period of time and then start to transmit.

In current, conventional wireless networks, there are three specifications in the IEEE Wireless LAN (WLAN) 802.11 family based on different Physical layer (reference numeral 12 of FIG. 1A) technologies: 802.11, 802.11a, and 802.11b. The general features of these specifications are well known in the art. All three of these specifications use CSMA/Collision Avoidance (CSMA/CA), also known as the distributed coordination function (DCF).

Figure 3:
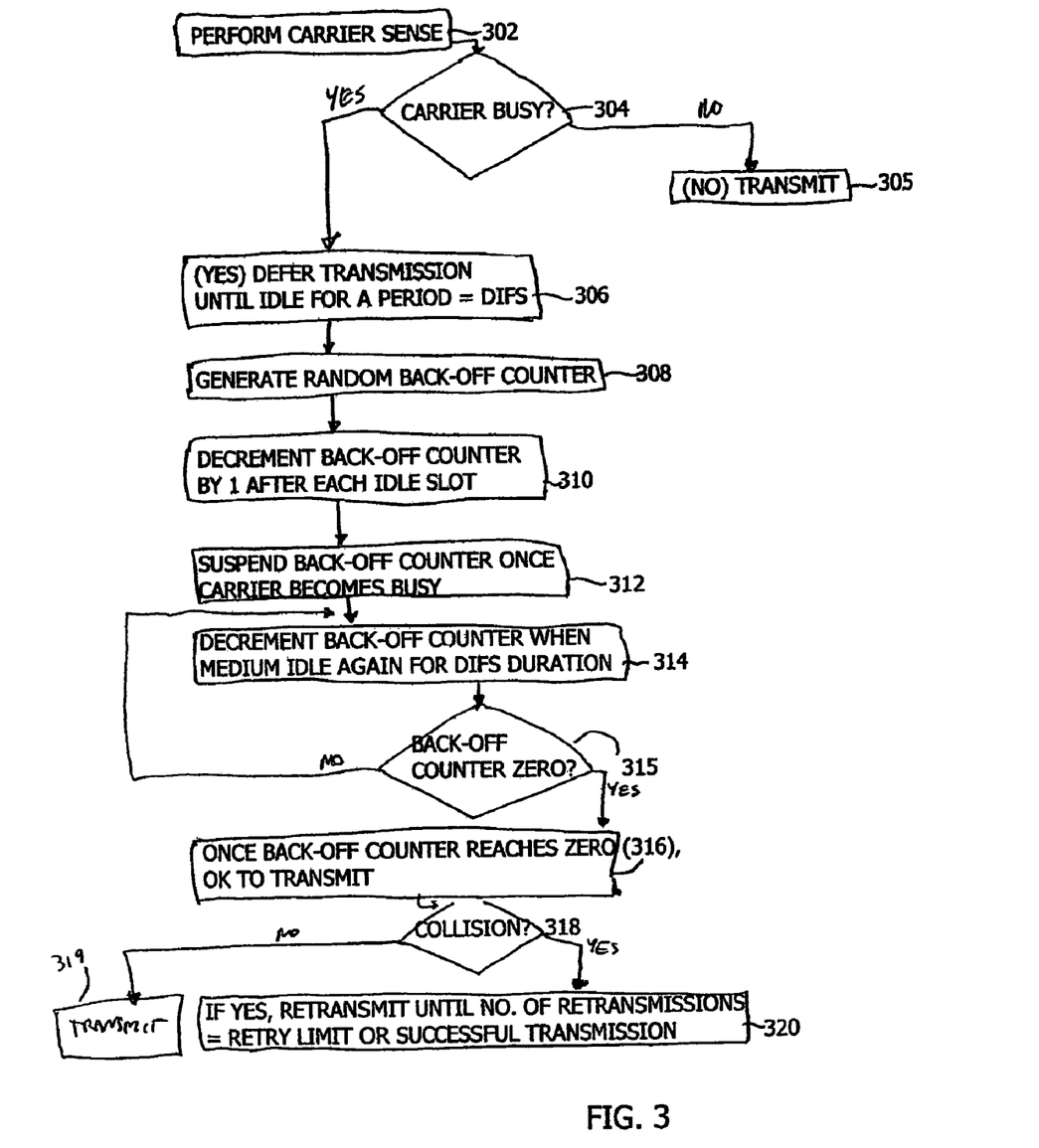
FIG. 3 (Prior Art) is a flowchart showing generally a prior art DCF collision avoidance method.

As depicted in FIG. 3 (Prior Art), in accordance with DCF, a node that attempts to access the channel first performs carrier sense (302) to determine the status of the medium. If the medium is busy (304), the node will defer (306) until the medium is idle for a period of time equal to DIFS (DCF Inter-Frame Space). After this DIFS idle period, the node generates a random back-off counter (308), which corresponds to the number of idle timeslots this node has to wait additionally before its transmission. The back-off counter is uniformly distributed over the interval [0, CW], where CW is the current Contention Window size.

The back-off counter is decremented by 1 after each idle slot (310). The back-off counter will be suspended once the medium becomes busy (312), and will be decremented when the medium is idle again for DIFS duration (314). Once the back-off counter reaches zero (316), the node is free to transmit. If more than one node starts to transmit in the same slot, a collision occurs (318). Upon collision, the colliding packets may be retransmitted until the number of retransmissions reaches the retry limit or a successful transmission is made (320).

Besides the basic access scheme presented above, DCF also has an optional virtual carrier sense scheme based on RTS/CTS (request to send/clear to send) frame exchange. The RTS/CTS access mode exchanges RTS/CTS handshake frames before the actual transmission of data packet to perform fast collision detection and channel reservation for large data frames. By using RTS/CTS handshake, each node in the neighborhood maintains a prediction of future traffic on the medium for the forthcoming data packet.

The CSMA/CA protocol has proven reasonably effective for applications with relatively low traffic load. As traffic loads increase, however, the effectiveness of the protocol declines, and its drawbacks become more pronounced. Moreover, as the use of wireless LANs continues to increase at near-exponential rates, future users will want the capability to communicate anywhere, anytime, from any device, with any content. Such communication needs require energy and bandwidth efficiency as well as quality of service (QoS) capability at the MAC layer—characteristics which CSMA/CA and other conventional protocols do not provide.

In the face of these challenges for future multimedia wireless packet networks, an improved, distributed media access protocol is required.

In particular, it would be desirable to provide a protocol that significantly improves communications efficiency and provides substantial savings in communications power.

It would also be desirable to provide a protocol that improves achievable network capacity so as to accommodate a larger number of users.

It would be desirable to provide a protocol that provides fair channel sharing among an arbitrary number of users, with fast convergence.

It would also be desirable to provide a protocol that enables inherent Quality of Service (QoS) capability with quantitative performance guarantees for different priority users.

Still further, it would be desirable to provide a protocol that is simple to implement, with low computational complexity and no additional control overhead or buffer requirements.

SUMMARY OF THE INVENTION

In one aspect of the invention, the medium access protocol is divided into two tasks: collision avoidance and contention resolution. The purpose of the collision avoidance is to avoid occasional collisions due to the synchronization of channel access among different stations. (In this range of operation, collisions are relatively rare, due to the nature of distributed random access.) The purpose of contention resolution is to control the overall sending rate of competing stations when the shared channel is operating at or near its capacity limits, such that excessive collisions can be avoided. (In this range, collisions are frequent, if no rate control is applied, due to traffic overload.) Contention resolution methods in accordance with the present invention include a graceful rate control mechanism described below.

Another aspect of the present invention provides methods for collision avoidance in a communications channel of a wireless network, using a back-off window of fixed size.

A further aspect of the present invention provides adaptive rate control for contention resolution. In accordance with this aspect of the invention, a gapping interval $G_i$ is inserted between consecutive packet transmissions. This gapping regulates the sending rate of the sending station in a manner described in greater detail below.

In a further aspect of the invention, to provide fair sharing of the channel and adapt to environmental changes, the normalized sending rate $R_i$ is regulated by an Additive Increase Multiplicative Decrease (AIMD) scheme or its similar derivatives.

In a further aspect of the invention, to provide differentiated channel sharing between competing users, different rate control (e.g., AIMD) parameters can be used by different users for QoS provision.

Thus, a system constructed in accordance with the methods aspects of the invention could include elements for applying an inter-transmission gapping for contention resolution, thereby replacing contention window control with binary exponential back-off in the CSMA/CA protocol. The system could also include elements for applying an adaptive, AIMD-like rate control for contention resolution, for using an inter-transmission gapping adjustment to enforce a regulated rate, and/or for prioritizing rate control algorithm parameter settings for QoS provisioning among different flows or users.

These and other aspects of the invention will next be described in connection with the attached drawings, taken in combination with the following detailed description of the invention.

BRIEF DESCRIPTION OF THE DRAWINGS

These and other features of the invention are described in detail below and illustrated in the attached drawings, as follows.

DETAILED DESCRIPTION OF THE INVENTION

Figure 2:
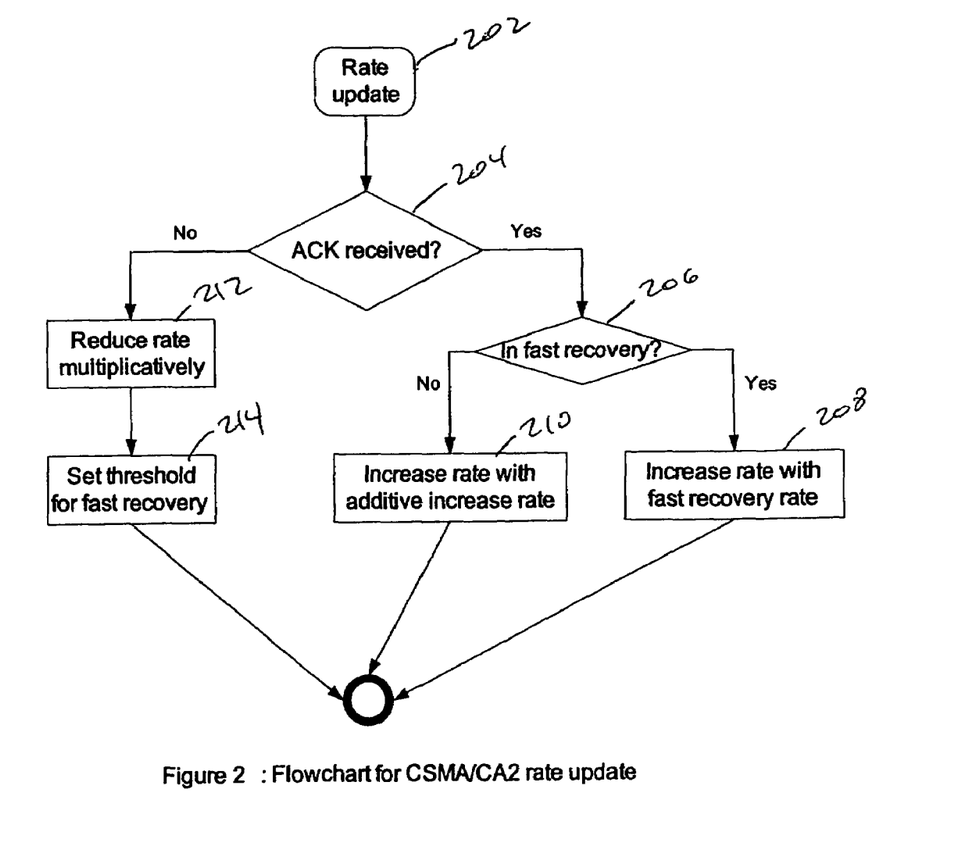
FIG. 2 is a flowchart showing generally the steps of a CSMA/CA2 rate adjustment procedure in accordance with the present invention.
Figure 4:
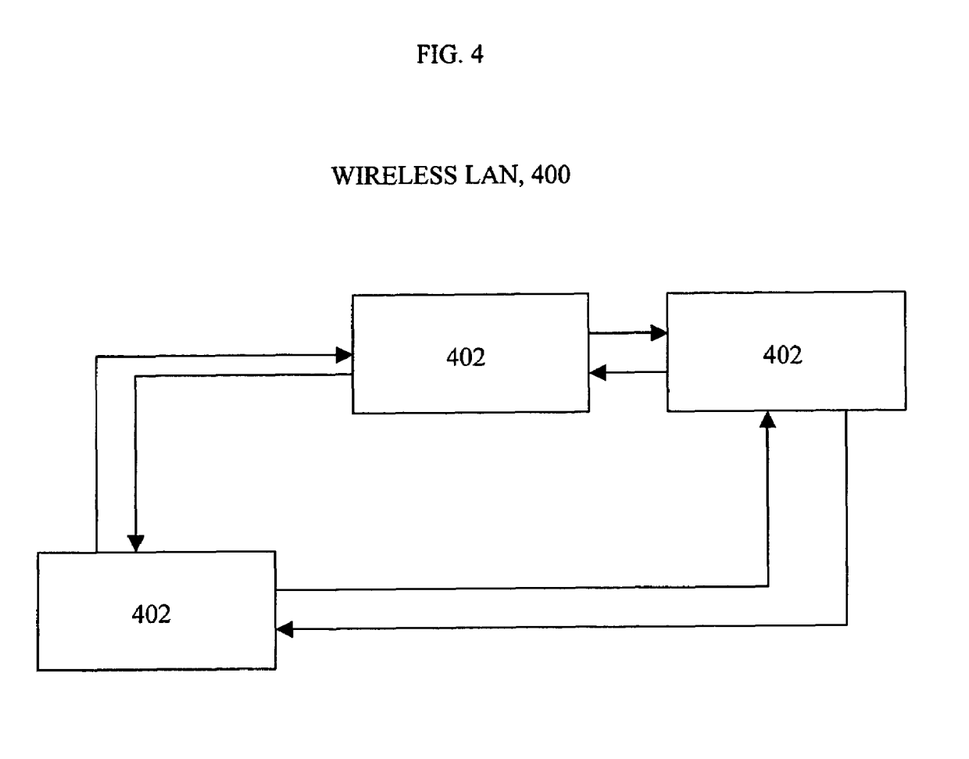
FIG. 4 is a schematic diagram of a LAN utilizing a communications protocol in accord with the invention.

The following discussion sets forth examples of a novel MAC protocol that overcomes the limitations of conventional CSMA/CA, and is suitable for deployment in high bandwidth wireless packet networks such as IEEE 802.11a/b/g-based wireless LANs and the like. As a general matter, the invention described herein is operable to provide medium access control in substantially any communications network that includes multiple communications stations coupled over a shared communications medium. See, for example, FIG. 4, which is a schematic diagram of a wireless LAN 400 in which the nodes 402 communicate utilizing a communications protocol in accordance with the invention. Features of the invention, which are described below with reference to FIGS. 1-2B, include the following:

Separation of random collision avoidance and contention resolution at the MAC layer: Referring now to FIGS. 1-2B, in one embodiment of the invention, the medium access protocol is divided into two tasks: collision avoidance and contention resolution. The purpose of the collision avoidance is to avoid occasional collisions due to the synchronization of channel access among different stations. Here the occurrences of collisions are rare and random, due to the nature of distributed random access.

The purpose of contention resolution is to control the overall sending rate of competing stations when the shared channel is operating at or near its capacity limits, such that excessive collisions can be avoided. At such levels, the occurrences of collisions are persistent, if no rate control is applied, due to traffic overload. Contention resolution methods in accordance with the present invention provide inter transmission gapping regulated by a graceful rate control mechanism, which is described in greater detail below.

Adaptive rate control mechanism for contention resolution: In accordance with the invention, each station controls its overall sending rate based on the history of its previous transmission attempts. By adjusting its rate via a graceful feedback control scheme that will next be described, each station achieves fair channel sharing and high transmission efficiency, which leads to energy savings and high network throughput. By using different control parameters at different stations, a prioritized medium access can be achieved among the different stations.

Figure 1B:
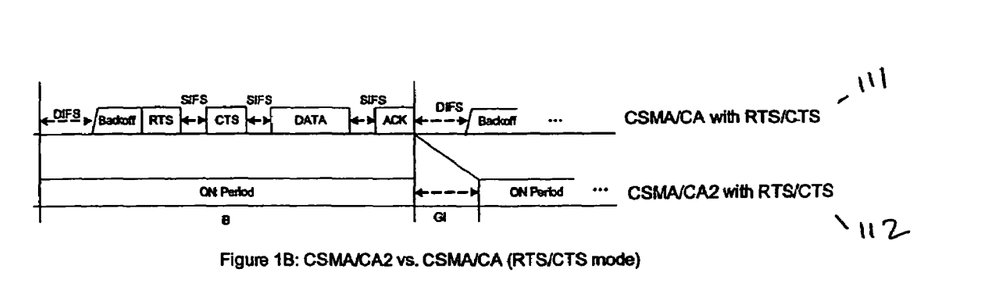
FIG. 1B is a diagram schematically depicting packet transmissions in conventional CSMA/CA with RTS/CTS mode, contrasted with packet transmissions in accordance with exemplary CSMA/CA2 techniques of the present invention.

Gapping Interval and Rate Control Aspects: FIG. 1 is a schematic diagram illustrating the differences between CSMA/CA (101) (conventional Carrier Sense Multiple Access with Collision Avoidance) and one possible implementation of the present invention, referred to herein as CSMA/CA2 (102). In particular, the upper portion of FIG. 1 shows a protocol frame in CSMA/CA (101), while the lower portion shows the features of CSMA/CA2 (102) in accordance with the invention. Similarly, FIG. 1B is a schematic diagram illustrating the differences between CSMA/CA (111) and CSMA/CA2 (112) with RTS/CTS mode.

As illustrated in FIG. 1, the CSMA/CA2 (102) protocol of the present invention provides the following:

Separation of contention window from contention resolution: CSMA/CA2 (102) uses a "back-off" (103) with a small fixed size of BW (in the present example, BW is 32) for channel access. The small "back-off" (103) window in the CSMA/CA2 (102) protocol of the present invention is used only for collision avoidance, desynchronizing multiple channel access when the channel status changes from busy to idle.

Introduction of a gapping interval ($G_i$): As shown in the lower portion of FIG. 1, in the CSMA/CA2 (102) protocol of the present invention, a gapping interval $G_i$ (104), generated from the uniform distribution between [0, G], is inserted between two consecutive packet transmissions (including retransmissions) (105, 106). This gapping regulates the sending rate of the sending station. Note that the progress of the gapping interval duration will not be suspended when the channel is busy.

In particular, referring again to FIG. 1, the transmission rate of each competing station i using CSMA/CA2 (102) in accordance with the invention is regulated by inserting a gapping interval of duration $G_i$ (104) between consecutive packet transmission attempts (105, 106). The normalized sending rate $R_i$ for each CSMA/CA2 (102) station is defined as:

$$R_i = B_i/(B_i+G_i) \quad (1)$$

where $B_i$ is the estimated duration of the CSMA/CA2 ON period, which is defined as the period of time for one packet transmission.

It is observed that as long as there are no collisions, there is no need for rate control and the CSMA/CA2 (102) protocol of the invention functions in the same manner as CSMA/CA (101). However, when collisions occur, CSMA/CA2 (102) gracefully adjusts the gapping interval duration $G_i$ (104) to reach the system equilibrium point where the network performance is optimized. From Equation (1) above, it is observed that by controlling $G_i$ (104) one can adaptively control the overall rate $R_i$ between 1 and 0. To provide fair sharing of the channel and adapt to environmental changes, the normalized sending rate $R_i$ is regulated by an Additive Increase Multiplicative Decrease (AIMD) scheme in accordance with the invention, as follows (and as depicted below in Table 1):

(1) In case of transmission failure, station i decreases $R_i$ by a ratio $\beta_i$:

$$R_i = R_i - \beta_i R_i \quad (2)$$

(2) In case of a successful transmission, station i increases $R_i$ by a rate $\alpha_i$ ($B_i+G_i$):

$$R_i = R_i + \alpha_i (B_i+G_i) \quad (3)$$

As a result, the increasing rate per unit time is a constant value $\alpha_i$ for each station i.

Advantageously, a fast recovery period is inherent in the AIMD rate control scheme of the invention. Unlike the exponential increase in the slow start period of TCP congestion control, for example, the rate increment in the fast recovery region of CSMA/CA2 is also linear, in order to guarantee system stability and fairness. Instead of $\alpha_i$ per second in the normal increase region, a greater speed, e.g., 100a per second rate increment, is used for the fast recovery region. In this example, the fast recovery threshold, after which fast recovery ends, is set to 0.0005 below the rate when the last collision occurred (other thresholds may alternatively be selected).

Table 1 shows an example of a software implementation of the above-described CSMA/CA2 rate adjustment method in accordance with the invention.

TABLE 1

Procedure update_rate( )
/* called after each transmission attempt */
Begin
   if (Ack received) /* successful transmission*/
      if($R_i$ < Threshold)
         /* fast recovery, increase $R_i$ by rate $\alpha_i$ per packet */
         $R_i = \min[R_i + 100\alpha_i (B_i + G_i);$ Threshold];
      else
         /* additive increase $R_i$ by rate $\alpha_i$ per second*/
         $R_i = R_i + \alpha_i (B_i + G_i)$;
   else /* transmission failure */
      Threshold = $R_i$ 0.0005;
      /* multiplicative decreases $R_i$ by ratio $\beta_i$ */
      $R_i = R_i - \beta_i R_i$;
end As shown in Table 1, by adjusting the normalized sending rate $R_i$ and setting the corresponding gap duration $G_i$ for each transmission according to Equation (1) above, the adjustment procedure seeks the equilibrium point of the network so that the overall sending rate of each station is optimized for high channel utilization, low collision and fair sharing. Note that this adjustment method can be applied on a per station basis, a per traffic class basis or a per flow basis, as desired or mandated by system architects and other implementers. A flowchart of the rate adjustment method is provided in FIG. 2. As shown therein, the rate update method is entered at step 202, followed by a check for receipt of ACK (204). If ACK has been received, the process includes a determination of whether fast recovery is required (206). If so, the process moves to increase rate with fast recovery rate (208). If fast recovery is not required, then the process moves to increase rate with additive rate increase (210). (See discussion of these method aspects above.)

If ACK has not been received, then the process moves to reduce rate multiplicatively (212) and to set a threshold for fast recovery (214). (See discussion of these method aspects above.)

Those skilled in the art will appreciate that the method aspects of the present invention, as described by way of example herein and depicted in the attached drawings, can be performed in hardware elements within a conventional wireless or non-wireless LAN or other network, or within software elements in the network, or by a combination of hardware and software, by the exercise of known techniques of hardware design and/or software programming.

CONCLUSION

Those skilled in the art will also appreciate that the invention set forth above and described by way of example in the foregoing Detailed Description, taken in combination with the attached drawing figures, provides significant advantages over the prior art.

In particular, the protocol and methods described herein significantly improve communications efficiency, thereby resulting in substantial savings in communications power. They improve achievable network capacity so as to accommodate a larger number of users. They also enable fair channel sharing among an arbitrary number of users, with fast convergence. Further, they enable inherent QoS capability with quantitative performance guarantees for different priority users, and are simple to implement, with low computational complexity and no additional control overhead or buffer requirements. Use of the invention will enable wireless LAN operators to improve power consumption while also improving the bandwidth of the wireless LAN and enabling QoS support to various classes of traffic.

Also unique to the present invention is that it integrates bandwidth efficiency, fair sharing, energy efficiency and QoS provision functionality into one simple scheme. Any trade-offs between these performance objectives can be easily adjusted via control theory-guided parameter tuning, in accordance with known principles. In addition, the proposed MAC protocol can coexist with IEEE 802.11 CSMA/CA.

The foregoing embodiments and practices are described solely by way example, and are not intended to limit the scope of the invention. Those skilled in the art will appreciate that numerous variations and modifications of the foregoing examples are possible and within the scope of the invention.

We claim:

1. A medium access control (MAC) protocol for use in a communications network having a plurality of nodes and a communication medium, each node having a normalized packet transmission rate $R_i$ and a packet transmission time $B_i$, the protocol comprising:
   delaying a packet transmission from at least one node i for a backoff window consisting of a random integer number of timeslots if the node i determines that the communication medium is in use, wherein the number of timeslots is uniformly distributed over an interval defined by
   [0, BW], where BW is a constant; and
   inserting an inter-transmission gap $G_i$ between each consecutive packet transmission from the node i, where the duration of the inter-transmission gap is dependent upon the normalized packet transmission rate for the node i and the packet transmission time for the node i, and the normalized packet transmission rate is adjusted based on whether a prior packet transmission attempt from the node i is acknowledged as successful.

2. The protocol of claim 1, wherein the duration of the inter-transmission gap $G_i$ for the node i is defined by $$R_i = B_i/(B_i + G_i).$$

3. The protocol of claim 1, wherein BW is zero.

4. The protocol of claim 1, wherein the normalized packet transmission rate $R_i$ is decreased if the prior packet transmission attempt from the node i is not acknowledged as successful and increased if the prior packet transmission attempt from the node i is acknowledged as successful.

5. The protocol of claim 1, wherein the normalized packet transmission rate $R_i$ is multiplicatively decreased if the prior packet transmission attempt from the node i is not acknowledged as successful and additively increased if the prior packet transmission attempt from the node i is acknowledged as successful.

6. The protocol of claim 2, further comprising a reduction ratio $\beta_i$ for each node, wherein the normalized packet transmission rate $R_i$ is decreased as a function of the reduction ratio if the prior packet transmission attempt from the node i is not acknowledged as successful, and wherein $$R_i = R_i - \beta_i R_i.$$

7. The protocol of claim 6, further comprising a threshold rate $T_i$ for each node, wherein the threshold rate is a function of the normalized packet transmission rate $R_i$, and wherein $T_i = R_i K$, where K is a constant value.

8. The protocol of claim 6, further comprising an additive constant $\alpha_i$ for each node, wherein the normalized packet transmission rate $R_i$ is increased as a function of the additive constant if the prior packet transmission attempt from the node i is acknowledged as successful, and wherein $$R_i = R_i + \alpha_i (B_i + G_i).$$

9. The protocol of claim 6, further comprising both an additive constant $\alpha_i$ and a threshold rate $T_i$ for each node, wherein the normalized packet transmission rate $R_i$ is increased as a function of the additive constant if the normalized packet transmission rate is greater than or equal to the threshold rate and the prior packet transmission attempt from the node i is acknowledged as successful, and wherein $$R_i = R_i + \alpha_i (B_i + G_i).$$

10. The protocol of claim 9, wherein the normalized packet transmission rate $R_i$ is increased as a function of the additive constant $\alpha_i$ and a multiplier M if the normalized packet transmission rate is less than the threshold rate $T_i$ and the prior packet transmission attempt from the node i is acknowledged as successful, and wherein $$R_i = \min[R_i + M\alpha_i(B_i + G_i); T_i].$$

11. The protocol of claim 2, further comprising both an additive constant $\alpha_i$ and a threshold rate $T_i$ for each node, wherein the normalized packet transmission rate $R_i$ is increased as a function of the additive constant if the normalized packet transmission rate is greater than or equal to the threshold rate and the prior packet transmission attempt from the node i is acknowledged as successful, and wherein
$R_i = R_i + \alpha_i (B_i + G_i)$, and $T_i = R_i K$, where K is a constant value.

12. A medium access control (MAC) protocol for use in a communications network having a plurality of nodes and a communication medium, each node having a normalized packet transmission rate $R_i$, a packet transmission time $B_i$, and a previously determined threshold rate $T_i$, the protocol comprising:
   delaying a packet transmission from at least one node i for a backoff window consisting of a random integer number of timeslots if the node i determines that the communication medium is in use, wherein the number of timeslots is uniformly distributed over an interval defined by
   [0, BW], where BW is a constant; and
   inserting an inter-transmission gap $G_i$ between each consecutive packet transmission from the node i, wherein the duration of the inter-transmission gap is defined by $$R_i = B_i/(B_i + G_i),$$

and the normalized packet transmission rate is adjusted in relation to the previously determined threshold rate.

13. The protocol of claim 12, wherein BW is zero.

14. The protocol of claim 12, further comprising a reduction ratio $\beta_i$ for each node, wherein the normalized packet transmission rate $R_i$ is decreased as a function of the reduction ratio if a prior packet transmission attempt from the node i is not acknowledged as successful, and wherein $R_i = R_i - \beta_i R_i$.

15. The protocol of claim 14, further comprising setting the threshold rate $T_i$ as a function of the normalized packet transmission rate $R_i$, and wherein $T_i = R_i K$, where K is a constant value.

16. The protocol of claim 15, further comprising an additive constant $\alpha_i$ for each node, wherein the normalized packet transmission rate $R_i$ is increased as a function of the additive constant if the normalized packet transmission rate is greater than or equal to the previously determined threshold rate $T_i$ and the prior packet transmission attempt from the node i is acknowledged as successful, and wherein $R_i = R_i + \alpha_i(\beta_i + G_i)$.

17. The protocol of claim 16, wherein the normalized packet transmission rate $R_i$ is increased as a function of the additive constant $\alpha_i$ and a multiplier M if the normalized packet transmission rate is less than the threshold rate $T_i$ and the at least one prior packet transmission attempt from the node i is acknowledged as successful, and wherein $R_i = \min[R_i + M\alpha_i(B_i + G_i); T_i]$.

* * * * *

UNITED STATES PATENT AND TRADEMARK OFFICE
CERTIFICATE OF CORRECTION

PATENT NO. : 7,428,241 B2  
APPLICATION NO. : 11/109492  
DATED : September 23, 2008  
INVENTOR(S) : Qi Xue et al.

It is certified that error appears in the above-identified patent and that said Letters Patent is hereby corrected as shown below:

Column 5, line 41, Equation (1) should read as follows:

--$R_i = B_i/(B_i+G_i)$--

Column 6, line 9, should read as follows:

"normal increase region, a greater speed, e.g., 100 --$\alpha_i$-- per second"

Claim 8, at column 8, line 13, should read as follows:

"constant --$\alpha_i$-- for each node, wherein the normalized packet"

Claim 8, at column 8, line 18, should read as follows:

--$R_i = R_i + \alpha_i(B_i+G_i)$--

Claim 14, at column 9, line 4, should read as follows:

--$R_i = R_i - \beta_i R_i$--

Signed and Sealed this

Eleventh Day of November, 2008

JON W. DUDAS  
*Director of the United States Patent and Trademark Office*